US009935386B2

(12) United States Patent
Deister et al.

(10) Patent No.: US 9,935,386 B2
(45) Date of Patent: Apr. 3, 2018

(54) CONNECTION UNIT FOR A COUPLING DEVICE, IN PARTICULAR A MULTIPLE COUPLING

(71) Applicant: EISELE PNEUMATICS GMBH & CO. KG, Waiblingen (DE)

(72) Inventors: Viktor Deister, Backnang (DE); Hakan Bolat, Hamburg (DE)

(73) Assignee: EISELE PNEUMATICS GMBH & CO. KG, Waiblingen (DE)

( * ) Notice: Subject to any disclaimer, the term of this patent is extended or adjusted under 35 U.S.C. 154(b) by 0 days.

(21) Appl. No.: 15/310,131

(22) PCT Filed: Apr. 30, 2015

(86) PCT No.: PCT/EP2015/000884
§ 371 (c)(1),
(2) Date: Nov. 10, 2016

(87) PCT Pub. No.: WO2015/172866
PCT Pub. Date: Nov. 19, 2015

(65) Prior Publication Data
US 2017/0162967 A1    Jun. 8, 2017

(30) Foreign Application Priority Data
May 14, 2014    (DE) .................. 10 2014 007 390

(51) Int. Cl.
*H01R 13/00* (2006.01)
*F16L 25/01* (2006.01)
*F16L 39/00* (2006.01)

(52) U.S. Cl.
CPC ............ *H01R 13/005* (2013.01); *F16L 25/01* (2013.01); *F16L 39/00* (2013.01)

(58) Field of Classification Search
CPC ......... H01R 13/005; F16L 25/01; F16L 39/00
(Continued)

(56) References Cited

U.S. PATENT DOCUMENTS 4,813,881 A * 3/1989 Kirby .................... H01R 13/111
439/381
6,113,431 A * 9/2000 Wong .................... H01R 9/0521
439/638
(Continued)

FOREIGN PATENT DOCUMENTS

| CA | 2 243 263 | 2/2000 |
| DE | 296 06 479 | 8/1996 |

(Continued)

OTHER PUBLICATIONS

International Search Report (ISR) issued Jul. 22, 2015 in International (PCT) Application No. PCT/EP2015/000884.

*Primary Examiner* — Harshad C Patel
(74) *Attorney, Agent, or Firm* — Wenderoth, Lind & Ponack, L.L.P.

(57) ABSTRACT

A coupling device, in particular a multiple coupling (1), connects a first line portion to a second line portion by a first coupling body (3) and second coupling body (5). A connection unit (23, 25) can be inserted into an accommodating opening (41, 42) in each coupling body (3, 5). A plug-in connection between line portions having electric conductors has an electrical connector (63) with plug-shaped and/or socket-shaped contact elements (67, 69). The connection unit (23, 25) is a cartridge with a single-part, sleeve-shaped housing (37) having a through-passage (39) accommodating the connector (63).

26 Claims, 3 Drawing Sheets

(58) Field of Classification Search
USPC ....... 439/190, 195, 201, 218, 259, 264, 299, 439/378, 527, 578–594, 649–655, 597, 439/747, 749, 638, 639, 671
See application file for complete search history.

(56) References Cited

U.S. PATENT DOCUMENTS

| | | | | |
|---|---|---|---|---|
| 6,398,593 | B1* | 6/2002 | Yeh | H01R 31/06 |
| | | | | 439/654 |
| 7,066,747 | B2* | 6/2006 | Nagano | H01R 13/641 |
| | | | | 439/157 |
| 7,442,080 | B1* | 10/2008 | Tsen | H01R 9/0503 |
| | | | | 439/181 |
| 7,901,240 | B2* | 3/2011 | Jackson | H01R 4/5025 |
| | | | | 439/465 |
| 8,690,602 | B2* | 4/2014 | Flaherty, IV | H01R 13/111 |
| | | | | 439/578 |
| 2011/0045694 | A1* | 2/2011 | Chee | H01R 24/542 |
| | | | | 439/578 |
| 2012/0214339 | A1* | 8/2012 | Stein | H01R 13/111 |
| | | | | 439/578 |
| 2013/0115809 | A1* | 5/2013 | Hanson | H01R 13/2421 |
| | | | | 439/578 |

FOREIGN PATENT DOCUMENTS

| | | |
|---|---|---|
| EP | 1 471 610 | 10/2004 |
| EP | 2 620 688 | 7/2013 |

\* cited by examiner

CONNECTION UNIT FOR A COUPLING DEVICE, IN PARTICULAR A MULTIPLE COUPLING

FIELD OF THE INVENTION

The invention relates to a connection unit for a coupling device, in particular a multiple coupling, for the plug-in connection of at least a first line section to a respective second line section by plugging together of a first coupling body, to which respective first line sections can be connected, with a second coupling body, to which respective second line sections can be connected. The connection unit can be inserted into an accommodating opening in a coupling body. To form a plug-in connection between line sections having electrical conductors, the connection unit has an electrical connector with plug-shaped and/or socket-shaped contact elements. The invention additionally relates to a coupling device having such a connection unit.

BACKGROUND OF THE INVENTION

Document EP 2 620 688 A2 discloses a multiple coupling with coupling bodies that can be plugged together and that have accommodating openings for connection units that can be inserted therein to establish a connection between corresponding line sections when the coupling bodies are plugged together. In addition to accommodating openings for connection units, which are connected to line sections conveying pressurized air or fluids, in the known multiple coupling accommodating openings for connection units are also provided, which connection units have an electrical connector to establish a plug-in connection between the line sections when the coupling bodies are plugged together.

SUMMARY OF THE INVENTION

A problem addressed by the invention is to provide an improved connection unit for the connection of electric line sections, which connection unit is distinguished by an easily producible, mechanically robust design.

According to the invention, this problem is basically solved by a connection unit having, as a significant feature of the invention, that the connection unit has a cartridge-shaped form with a one-piece sleeve-like housing, which has a passage accommodating the connector. Compared with the known prior art solution, in which the connection unit is formed by separate elements that are connected to one another by screwing, the design according to the invention with a cartridge-shaped one-piece housing allows more efficient and more economical production. Because the connection unit forms a homogeneous structure, the handling and mounting operations to be realized when using the connection unit in the case of installation in a corresponding coupling device are also simplified. The connection unit is also distinguished by a mechanically robust design thanks to the one-piece formation of the housing.

In exemplary embodiments, in which the electrical connector is accommodated in the housing without projection of the contact elements over the ends of the passage, the contact elements are particularly effectively protected from external forces, which could lead, for example, to a bending of plug pins.

Particularly advantageously, the sleeve-like housing is formed from a metal material, with the connector having support parts made of plastic for the contact elements. Such plastic parts can, for example, be secured by clipping with catches located in the passage of the housing, so that the installation of the connector in the housing can be efficiently designed.

The connection unit according to the invention can, as a connection unit of a first type, form a plug element, which can be inserted into an accommodating opening in the first coupling body. In this formation as a plug element, the connector has plug-shaped contact elements at the end which faces the second coupling body in the installation position.

In a second connection unit type, the connection unit forms a socket element, which can be inserted into an accommodating opening in the second coupling body. In this formation, the connector has socket-shaped contact elements at the end which faces the first coupling body in the installation position, the plug element and socket element thus form the electrical plug-in connection of the line sections when the coupling bodies are plugged together.

The arrangement can advantageously be such that the plug element has socket-shaped contact elements at the end opposite the plug-shaped contact elements and such that the socket element has plug-shaped contact elements on the end opposite the socket-shaped contact elements for the connection of a corresponding line section. In this way, the connection units form an intermediate plug so to speak which, for the connection of the line sections, has a female connector on the one hand and a plug on the other hand, so that the connection of the line sections can again be easily realized by plug-in connections.

In particularly advantageous exemplary embodiments, in the case of both the plug element and the socket element, the housings are each formed, on the end which faces the opposite coupling body in the installation position, in such a way that the housings slot together in a telescopic manner when the two coupling bodies are plugged together. In the coupled state, the contact elements of the plug element and the socket element are then enveloped and protected by a sleeve passing over both coupling bodies. In order to permit a telescopic-type interlocking, the plug element can have, on the end having the plug-shaped contact elements, a tapered internally cylindrical end area that is recessed by a step. On the end overlapping the tapered end area, the socket element can have, on the end having the socket-shaped contact elements, a cylindrical section with an internal diameter, which is adapted to the external diameter of the tapered end area of the plug element and which, at the inner end, transitions into the adjacent part of the passage at a shoulder projecting radially inwards.

If, in this formation, the axial lengths of the tapered end area of the plug element and of the cylindrical section of the socket element are adapted to one another in such a way that, in the case of plugged together coupling bodies and telescopically slotted together housings of the plug element and socket element, the end of the housing of the socket element abuts the step of the plug element, and the end of the tapered end section of the plug element abuts the shoulder in the cylindrical section of the socket element. The housings abut one another axially in the telescopically slotted together state and are then secured against axial movements towards one another in their respective accommodating opening in the coupling body.

The accommodating openings in the first and second coupling bodies and the shape of the outside of the housing of the plug element and socket element can advantageously be shaped such that they can be inserted from the end of the coupling bodies facing the respective opposite coupling body into the assigned accommodating opening. In order to fix the plug element and the socket element in an unambiguous axial position when the coupling bodies are plugged together and when the housings abut one another at the ends, the housing of the plug element and the socket element need only each have on the outside at least one radially projecting housing part that, in conjunction with a formation of the wall of the accommodating opening, prescribes the axial position of the housing in one direction.

In addition, a radially projecting housing part of the plug element and the socket element in conjunction with a longitudinal groove provided on the internal wall of the corresponding accommodating opening prescribes a rotational position for the housing. This arrangement then ensures that, when the coupling bodies are plugged together, the plug-shaped contact elements, such as plug pins, of the plug element establish the plug-in connection with the socket-shaped contact elements of the socket element in an operationally reliable manner.

The subject matter of the invention is also a coupling device, in particular a multiple coupling, which has at least one connection unit according to the invention.

Other objects, advantages and salient features of the present invention will become apparent from the following detailed description, which, taken in conjunction with the drawings, discloses a preferred embodiment of the present invention.

BRIEF DESCRIPTION OF THE DRAWINGS

Referring to the drawings that form a part of this disclosure.

DETAILED DESCRIPTION OF THE INVENTION

Figure 1:
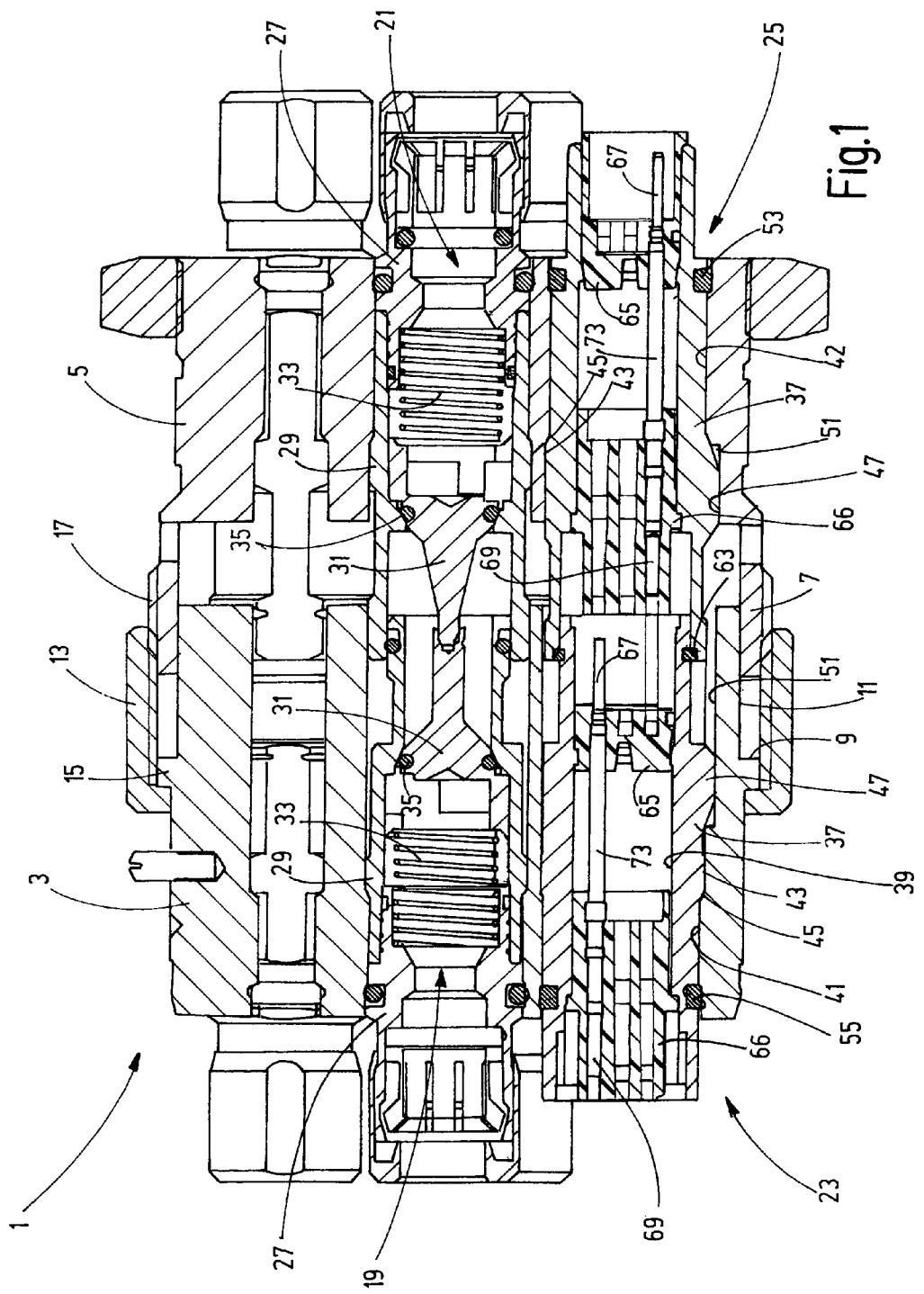
FIG. 1 is a side view in section of a multiple coupling, which has connection units according to an exemplary embodiment of the invention, wherein the coupling bodies of the coupling are depicted in a position only partially plugged together.

FIG. 1 shows a multiple coupling 1 with a first coupling body 3 and a second coupling body 5, which can be plugged together in order to simultaneously couple to one another line sections (not depicted in the drawing). The line sections are connected to the coupling bodies 3 and 5 by plug-in connections. FIG. 1 depicts the coupling bodies 3 and 5 in a position wherein they are only partially plugged together. After further slotting together into the plugged together coupling or coupled position, wherein the second coupling body 5 comes to abut by its cylindrical end part 7 on a stop shoulder 9 of the overlapped outside 11 of the first coupling body 3, the coupling bodies 3 and 5 can be fixed to one another by a union nut 13. This union nut 13 passes over an annular flange 15 projecting on the outside of the first coupling body 3. On the one side of annular flange 15, the stop shoulder 9 is located. The union nut 13 is engaged with an external thread 17 on the end part 7 of the second coupling body 5.

The multiple coupling 1 corresponds to the prior art as disclosed in the previously mentioned document EP 2 620 688 A2 in terms of the design of the coupling bodies 3 and 5, with accommodating openings for connection units formed therein. This correspondence also applies to the design of the connection units 19 and 21 in FIG. 1, for line sections that convey media capable of flowing such as pressurized air or fluids. The description of these components known per se from the mentioned document can be limited to the essential details. In addition to these connection units known per se, connection units according to the invention are provided in some of the accommodating openings arranged on a circular line concentric to the coupling axis, eight of which accommodating openings are provided, for example. One of these connection units 23 sits in the first coupling body 3 and is formed as a plug element. One connection unit 25 sits in the second coupling body 5 and is formed as a socket element.

Of the connection units intended for media capable of flowing, a connection unit 19 in the coupling body 3 and a connection unit 21 in the coupling body 5 are visible in the sectional representation of FIG. 1. As depicted, both connection units 19, 21 have an outer housing element 27 for the line connection and a second housing element 29 connected to the outer housing element by screwing. A valve body 31 is movable in each of these housing elements, which valve body 31 is pre-tensioned by a valve spring 33 into the depicted closed position, in which it seals against a valve seat 35. When the coupling bodies 3 and 5 are plugged together further, the abutment of the valve body 31 results in the opening of the respective valve countering the closing force of the valve springs 33.

Figure 2:
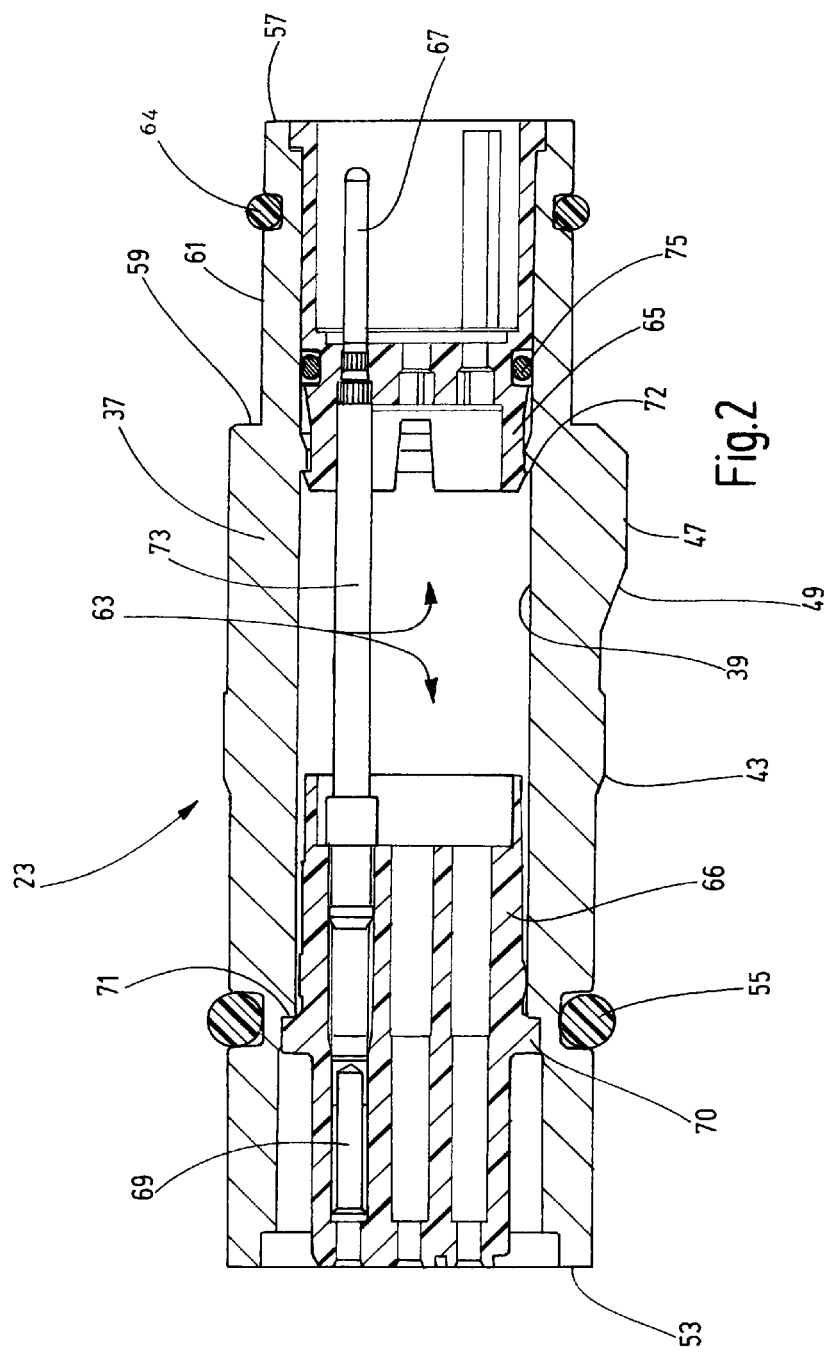
FIG. 2 is a side view in section drawn on a larger scale compared with FIG. 1, wherein an exemplary embodiment of the connection unit according to the invention is shown in the form of a plug element.

The exemplary embodiment of the connection unit according to the invention formed as a plug element 23 is depicted separately in FIG. 2. As can be seen, the plug element 23 has a kind of cartridge shape with a one-piece metal housing 37 in the form of a sleeve. The sleeve has on its outside circular cylindrical wall sections and on the inside a passage 39 having circular cylindrical internal wall sections. The housing 37 can be inserted into an accommodating opening 41, which is continuously formed in the first coupling body 3, from the side lying on the inside in the coupling 1, in other words, from the side facing the second coupling body 5. To prevent a movement out of the installation position towards the outside of the coupling 1, the housing 37 has on the outside a radially projecting housing part 43, which abuts a step 45 formed on the internal wall of the accommodating opening 41 in the installation position. For the securing of the inserted housing 37 in the correct rotational position, the housing 37 has another radially projecting housing part 47, which has a V-shaped cross-section and forms a slanting edge 49. The housing part 47 enters into a longitudinal groove 51 formed on the internal wall of the accommodating opening 37 in the insertion operation to fix the rotational position. In the vicinity of the end 53 lying on the outside in the installation state, an O-ring 55 sitting in an annular groove of the housing wall forms the seal for the accommodating opening 37.

In the vicinity of the other end 57, the outside of the housing 37 transitions at a step 59 into a tapered or reduced diameter, cylindrical end area 61. An annular groove is formed on end area 61 as a seat for another O-ring 64 in the vicinity of the end 57.

An electrical connector 63 is arranged inside the passage 39 of the housing 37. This electrical connector has support parts 65 and 66 made of plastic for contact elements accessible on the ends 57 and 53 of the housing 37 for the formation of plug-in connections. In the formation of the connection unit as a plug element 23 shown in FIG. 2, the support part 65 has a ring of plug pins 67, only one of which is depicted. For the sake of clarity, a further seven pins arranged on a circular line are omitted. The plug pins 67 accessible at the end 57 form the plug-in connection with the connection unit formed as a socket element 25 when the coupling bodies 3 and 5 are plugged together. The other support part 66 of the connecting means 63 has a corresponding arrangement of socket-like contact elements in the form of female connectors 69, of which once again only one of the ring of eight female connectors is depicted. The corresponding support part 66 can be inserted from the end 53 into the passage 39. A circumferential annular flange 70 abuts against a step 71 of the passage 39 to prevent an axial movement towards the other support part 65. The support part 65 is fixed to prevent an axial movement towards the end 57 by clipping on a lug 72 of the passage 39. The support parts 65 and 66 are connected with one another by conductor rods 73, which also form the electrical connection between plug pins 67 and female connectors 69. An O-ring 75 is provided in an annular groove of the support part 65 as a seal of the passage 39.

Figure 3:
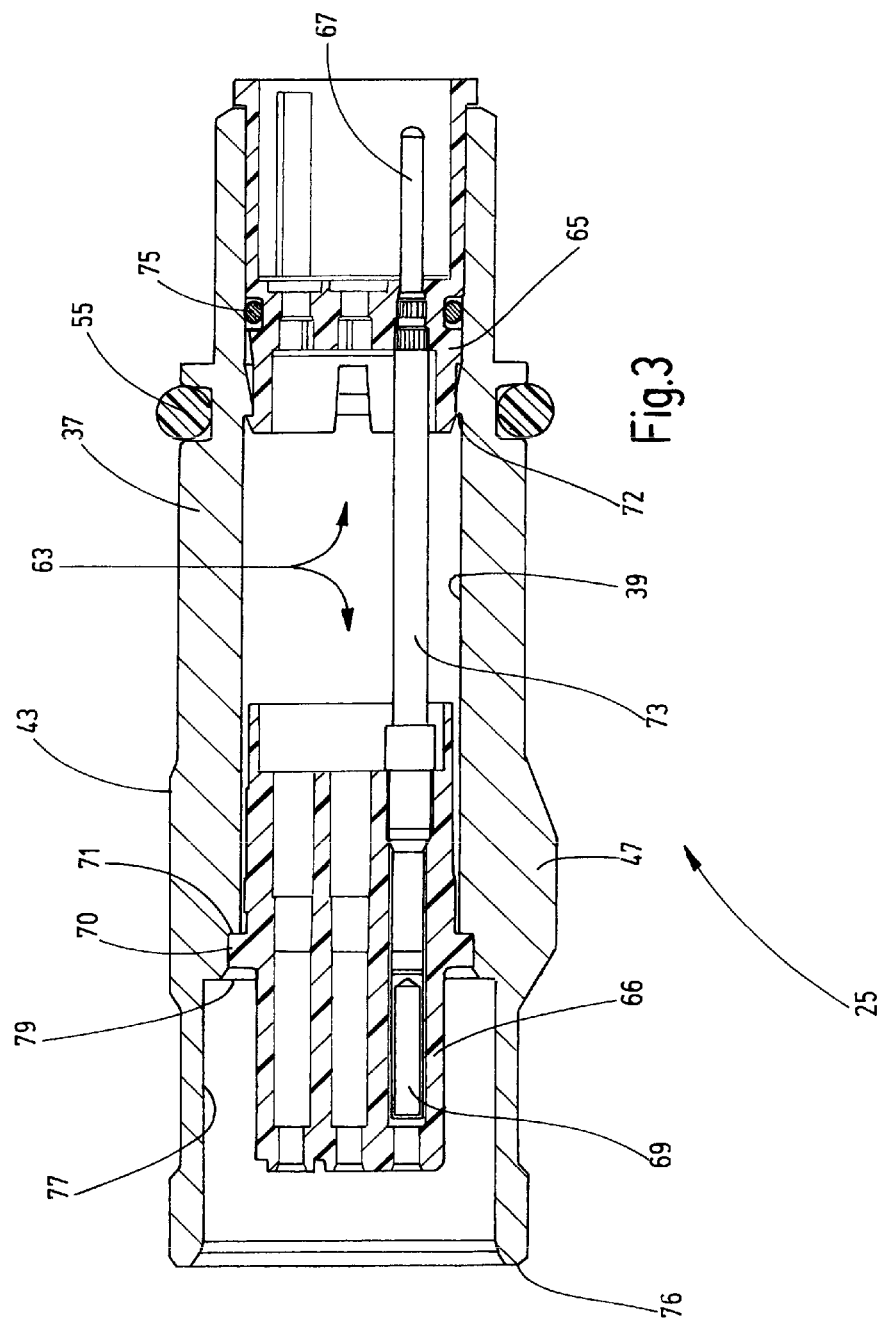
FIG. 3 is a side view in section corresponding to FIG. 2 of an exemplary embodiment of the connection unit according to the invention in the form of a socket element.

The initial example of the connection unit depicted in FIG. 3, which is formed as a socket element 25, can, like the plug element 23, also be inserted from the inside of the coupling 1 into the assigned accommodating opening 42 in the second coupling body 5. The sleeve-shaped one-piece housing 37 with a passage 39 and a connector 63 arranged therein generally corresponds to the plug element 23 of FIG. 2, so that, in as far as the details are the same, the same reference numerals are given. As previously, projecting housing parts 43 and 47 in conjunction with corresponding formations of the internal wall of the accommodating opening 42 are provided for the fixation of the axial position and of the rotational position. One significant difference however is that, at the end 76 lying on the inside in the coupling 1 in the installation position, a cylindrical section 77 is formed in the passage 39 of the housing 37. The cylindrical section forms a kind of inner cylinder, the internal diameter of which is adapted to the external diameter of the tapered end area 61 of the plug element 23. When the coupling bodies 3 and 5 are plugged together, the end area 61 of the plug element 23 and the cylindrical section 77 then slot together in a telescopic manner, with the O-ring 64 forming the seal of one of the insides of the cylindrical section 77 of the socket element 25. The end 57 simultaneously comes into abutment with a shoulder 79 at the end of the inner cylindrical section 77 in the fully plugged together state.

In the plugged together state of the coupling 1, the telescopically slotted together connection units in the form of plug element 23 and socket element 25 effectively form an intermediate plug. For the connection of the corresponding line sections to the outsides, on the one hand the female connectors 69 of the plug element 23 and on the other hand the plug pins 67 of the socket element 25 are available.

While one embodiment has been chosen to illustrate the invention, it will be understood by those skilled in the art that various changes and modifications can be made therein without departing from the scope of the invention as defined in the claims.

The invention claimed is:

1. A coupling device comprising:
   first and second coupling bodies connectable to first and second line sections, respectively, and connecting the first and second line sections together when said first and second coupling bodies are plugged together;
   first and second connection units for the first and second line sections inserted in first and second accommodating openings in said first and second coupling bodies, respectively, said first and second connection units having first and second, one-piece housings, respectively, with first and second passages, respectively, therein; and
   first and second electrical connectors with plug-shaped or socket-shaped contact elements in said first and second passages of said first and second connection units, respectively, each of said first and second connectors being accommodated in the respective housing without protection of said contact elements over ends of the respective passage.

2. A coupling device according to claim 1 wherein
   each said housing is formed of a metal material; and
   each said electrical connector has plastic support parts mounting the respective contact elements in the respective housings.

3. A coupling device according to claim 1 wherein
   said first connection unit forms a plug element inserted into said first accommodating opening in said first coupling body, with said contact elements of said first electrical connector being plug-shaped contact elements at an end of said first electrical connector facing said second unit coupling body in an installation position.

4. A coupling device according to claim 3 wherein
   said second connection unit forms a socket element inserted into said second accommodating opening in said second coupling body, with said contact elements of said second electrical connector being socket-shaped contact elements at an end of said second electrical connector facing said first coupling body in an installation position.

5. A coupling device according to claim 4 wherein
   said first and second housing having facing ends that slot together telescopically when said first and second coupling bodies are plugged together.

6. A coupling device according to claim 4 wherein
   said first housing has a tapered cylindrical end area recessed by a step on an end of said first housing facing said second housing.

7. A coupling device according to claim 6 wherein
   said second housing has an inner cylindrical section in said second passage with an internal diameter adapted to an external diameter of said tapered cylindrical end area of said first housing at an end of said second housing facing said first housing, said inner cylindrical section having a shoulder projecting radially inward at an inner end of said inner cylindrical section.

8. A coupling device according to claim 7 wherein
   axial lengths of said tapered cylindrical end area of said first housing and said inner cylindrical section of said second housing are adapted to one another such that an end of said second housing abuts said step on said first housing and an end of said first housing abuts said shoulder of said inner cylindrical section when said first and second coupling bodies are plugged together and said first and second housings are telescopically slotted together.

9. A coupling device according to claim 3 wherein
   said plug-shaped contact elements have contact sockets on ends of said plug-shaped contact elements remote from said second connection unit for connection of the first line sections.

10. A coupling device according to claim 1 wherein
said socket-shaped contact elements has contact plugs on ends of said socket-shaped contact elements remote from said first connection unit for connection of the second line sections.

11. A coupling device according to claim 1 wherein
said first and second connection units are insertable from facing ends of said first and second coupling bodies in the respective accommodating openings.

12. A coupling device according to claim 1 wherein
each of said first and second housings has a radially outwardly extending projection engaging a formation in the respective accommodating opening in the respective coupling body prescribing axial positions of said first and second housings in said first and second coupling bodies, respectively.

13. A coupling device according to claim 1 wherein
each of said first and second housings has a radially outwardly projecting part received in a longitudinal groove in an internal wall of the respective accommodating opening in the respective coupling body prescribing rotational positions of said first and second housings in said first and second coupling bodies, respectively.

14. A coupling device, comprising:
first and second coupling bodies connectable to first and second line sections, respectively, and connecting said first and second line sections together when said first and second coupling bodies are plugged together;
first and second connection units for the first and second line sections inserted in first and second accommodating openings in said first and second coupling bodies, respectively, said first and second connection units having first and second, one-piece metal housings, respectively, with first and second passages, respectively, therein;
first and second electrical connectors with plug-shaped or socket-shaped contact elements in said first and second passages of said first and second connection units, respectively; and
plastic support parts in said first and second electrical connectors mounting the respective contact elements in the respective housings.

15. A coupling device according to claim 14 wherein
said first connection unit forms a plug element inserted into said first accommodating opening in said first coupling body, with said contact elements of said first electrical connector being plug-shaped contact elements at an end of said first electrical connector facing said second unit coupling body in an installation position.

16. A coupling device according to claim 15 wherein
said second connection unit forms a socket element inserted into said second accommodating opening in said second coupling body, with said contact elements of said second electrical connector being socket-shaped contact elements at an end of said second electrical connector facing said first coupling body in an installation position.

17. A coupling device according to claim 16 wherein
said plug-shaped contact elements have contact sockets on ends of said plug-shaped contact elements remote from said second connection unit for connection of the first line sections.

18. A coupling device according to claim 17 wherein
said first and second housing having facing ends that slot together telescopically when said first and second coupling bodies are plugged together.

19. A coupling device according to claim 17 wherein
said first housing has a tapered cylindrical end area recessed by a step on an end of said first housing facing said second housing.

20. A coupling device according to claim 19 wherein
said second housing as an inner cylindrical section in said second passage with an internal diameter adapted to an external diameter of said tapered cylindrical end area of said first housing at an end of said second housing facing said first housing, said inner cylindrical section having a shoulder projecting radially inward at an inner end of said inner cylindrical section.

21. A coupling device according to claim 20 wherein
axial lengths of said tapered cylindrical end area of said first housing and said inner cylindrical section of said second housing are adapted to one another such that an end of said second housing abuts said step on said first housing and an end of said first housing abuts said shoulder of said inner cylindrical section when said first and second coupling bodies are plugged together and said first and second housings are telescopically slotted together.

22. A coupling device according to claim 14 wherein
said socket-shaped contact elements has contact plugs on ends of said socket-shaped contact elements remote from said first connection unit for connection of the second line sections.

23. A coupling device comprising:
first and second coupling bodies connectable to first and second line sections, respectively, and connecting the first and second line sections together when said first and second coupling bodies are plugged together;
first and second connection units for the first and second line sections inserted in first and second accommodating openings in said first and second coupling bodies, respectively, said first and second connection units having first and second, one-piece housings, respectively, with first and second passages, respectively, therein, said first and second connection units being insertable from facing ends of said first and second coupling bodies in the respective accommodating openings; and
first and second electrical connectors with plug-shaped or socket-shaped contact elements in said first and second passages of said first and second connection units, respectively.

24. A coupling device comprising:
first and second coupling bodies connectable to first and second line sections, respectively, and connecting the first and second line sections together when said first and second coupling bodies are plugged together;
first and second connection units for the first and second line sections inserted in first and second accommodating openings in said first and second coupling bodies, respectively, said first and second connection units having first and second, one-piece housings, respectively, with first and second passages, respectively, therein, each of said first and second housings having a radially outwardly extending projection engaging a formation in the respective accommodating opening in the respective coupling body prescribing axial positions of said first and second housings in said first and second coupling bodies, respectively; and first and second electrical connectors with plug-shaped or socket-shaped contact elements in said first and second passages of said first and second connection units, respectively.

25. A coupling device comprising:

first and second coupling bodies connectable to first and second line sections, respectively, and connecting the first and second line sections together when said first and second coupling bodies are plugged together;

first and second connection units for the first and second line sections inserted in first and second accommodating openings in said first and second coupling bodies, respectively, said first and second connection units having first and second, one-piece housings, respectively, with first and second passages, respectively, therein, each of said first and second housings having a radially outwardly projecting part received in a longitudinal groove in an internal wall of the respective accommodating opening in the respective coupling body prescribing rotational positions of said first and second housings in said first and second coupling bodies, respectively; and first and second electrical connectors with plug-shaped or socket-shaped contact elements in said first and second passages of said first and second connection units, respectively.

26. A coupling device comprising:

first and second coupling bodies connectable to first and second line sections, respectively, and connecting the first and second line sections together when said first and second coupling bodies are plugged together;

first and second connection units for the first and second line sections inserted in first and second accommodating openings in said first and second coupling bodies, respectively, said first and second connection units having first and second, one-piece housings, respectively, with first and second passages, respectively, therein, said first housing having a tapered cylindrical end area recessed by a step on an end of said first housing facing said second housing, said second housing having an inner cylindrical section in said second passage with an internal diameter adapted to an external diameter of said tapered cylindrical end area of said first housing at an end of said second housing facing said first housing, said inner cylindrical section having a shoulder projecting radially inward at an inner end of said inner cylindrical section; and first and second electrical connectors with plug-shaped or socket-shaped contact elements in said first and second passages of said first and second connection units, respectively.

* * * * *